(12) United States Patent
Feig et al.

(10) Patent No.: US 7,251,833 B2
(45) Date of Patent: Jul. 31, 2007

(54) DIGITAL MEDIA DELIVERY WITH LOCAL CACHE AND STREAMING TOKENS

(75) Inventors: Ephriam Feig, San Diego, CA (US); Shu-Chun Jeane Chen, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 09/750,266

(22) Filed: Dec. 29, 2000

(65) Prior Publication Data

US 2002/0085713 A1 Jul. 4, 2002

(51) Int. Cl.
*G06F 7/04* (2006.01)
*H04N 7/167* (2006.01)

(52) U.S. Cl. .................... 726/27; 726/26; 380/228; 380/231; 713/193

(58) Field of Classification Search .............. 726/26, 726/27; 380/228, 231; 713/193
See application file for complete search history.

(56) References Cited

U.S. PATENT DOCUMENTS

| | | | | |
|---|---|---|---|---|
| 5,414,455 A | | 5/1995 | Hooper et al. ............ 348/7 |
| 5,442,390 A | | 8/1995 | Hooper et al. ............ 348/86 |
| 5,719,937 A | * | 2/1998 | Warren et al. ............ 380/203 |
| 5,963,909 A | * | 10/1999 | Warren et al. ............ 705/1 |
| 6,055,314 A | * | 4/2000 | Spies et al. ............ 380/228 |

OTHER PUBLICATIONS

The American Heritage College Dictionary, 2002, Houghton Mifflin Company, 4th edition, p. 1376.*

* cited by examiner

*Primary Examiner*—Kambiz Zand
*Assistant Examiner*—Jacob Lipman

(57) ABSTRACT

A method is disclosed for enforcing the sequential playback of a multimedia file. In one aspect of the method, a sending server stores a multimedia file which is then partitioned into a plurality of sequential data blocks. The server generates a plurality of enabling tokens each corresponding to one of the plurality of sequential data blocks. The server then encodes each respective one of the pluralities of sequential data blocks with a corresponding one of the plurality of enabling tokens, producing a plurality of encoded sequential data blocks. The server then transfers the encoded sequential data blocks to a receiving client. The server also transfers the plurality of enabling tokens to the receiving client. In this manner, the server retains control over the client receiver's playback of the multimedia file.

18 Claims, 4 Drawing Sheets

DIGITAL MEDIA DELIVERY WITH LOCAL CACHE AND STREAMING TOKENS

FIELD OF THE INVENTION

The disclosed invention broadly relates to data processing networks and more particularly relates to the dissemination of media files in a network.

BACKGROUND

Media delivery today is done either by preloading a media file to local cache and then giving the user access to the contents of the file or, alternately, using streaming technology. In streaming technology, a media file is delivered in real time. Advantages of preloading include that there is no real time requirement as is needed for streaming and one can avoid unpredictable playback defects due to unpredictable congestion on the network. Disadvantages of preloading include the likely probability that a stored media file may not be secure and the possibility of unauthorized playback or copying of the stored media file may occur. In addition, the content of the media file delivered has only coarse control when accessed or played back. For example, the deliverer or copyright owner of the media file may impose a time limit for authorized access or playback of the stored media file. Additionally, the deliverer or copyright owner would not normally know exactly how much time was actually spent by the user accessing or playing back the media file. Furthermore, the deliverer or copyright owner would not normally know precisely when access or playback of the media would have occurred and at what time such access or playback actually occurred. Playback information would typically be available only in broadcast mode in the prior art, since the deliverer or copyright owner would know exactly when each segment of the media file was broadcast, to whom it was broadcast, and to whom it would have been received by or delivered to.

Advantages with prior art broadcast mode streaming techniques are similar to the advantages with on-demand or multicasting on the internet. The deliverer or copyright owner will know exactly when every portion of the media is delivered. Disadvantages of broadcast mode streaming, on-demand or multicasting, are that the bandwidth requirements are typically significant, many users with differing receiving equipment are typically participating, and many of the receiving users may request diverse media file contents. Streaming does have the advantage, however, that one receives media only as desired.

What is needed is the ability to deliver a media file to a cache which is local to a user, but which is not accessible by the user until the media file deliverer or copyright owner authorizes access to or playback of the media file.

SUMMARY

These and other features and advantages of the preferred embodiment are accomplished by the method for enforcing the sequential playback of a media file disclosed herein. In one aspect of the preferred embodiment, a sending server stores a media file and partitions the media file into a plurality of sequential data blocks. Thereafter, the server generates a plurality of cryptographic token keys, each token key corresponding to one of the plurality of sequential data blocks. Then the server encrypts each respective one of the plurality of sequential data blocks using a corresponding token key, thereby producing a plurality of encrypted sequential data blocks. The server then transfers the encrypted sequential data blocks to a client receiver. At the same time or at a predetermined later time, the server transfers the plurality of token keys to the client receiver for immediate or later use. In this manner, the server retains control over the playback of the media file. The media file may be of any type of machine readable file including, for example, a multimedia file, sound file, video file, or other time-sequential file for presentation which can be perceived by one or more of the senses. Additionally, the media file could comprise database files or other text files.

In the example of the preferred embodiment illustrated herein a media file is partitioned into a plurality of sequential data blocks which can be compressed. It is preferred that the partitioning of the media file, for example, be based upon a unit of time or unit of memory. It should be understood, however, that the media file may be partitioned in any desired manner necessary in carrying out the essence of the preferred embodiment.

One technique for sequentially enabling the client receiver to receive, decrypt, and playback the media file, is by the server generating a plurality of cryptographic token keys, one for each of the plurality of sequential data blocks. The server then encrypts each respective one of the plurality of sequential data blocks using a corresponding one of the plurality of token keys thereby producing a plurality of encrypted sequential data blocks.

After the plurality of sequential data blocks have been encrypted, they are buffered in an encrypted data block transmitter for subsequent transmission to the client receiver. There are a number of ways the encrypted sequential data blocks may be transferred to the client receiver. The encrypted sequential data blocks may, for example, be transmitted over a communications link one at a time in a sequentially or transmitted as a single file. Alternatively, the encrypted sequential data blocks could be stored on a machine readable storage medium and sold in a traditional "brick-and-mortar" store.

After the client receiver has received the encrypted sequential data blocks, the cryptographic token keys needed for decryption would be transmitted to the receiver client by the server. In the preferred embodiment, for example, the token keys would also be transmitted to the client receiver over a communications link. In order to retain the desired control over the user's access to or playback of the media file, it is preferred that the token keys are transmitted to the client receiver by sequentially streaming each of the token keys, one at a time, enabling a one-to-one decryption and playback of the encrypted sequential data blocks. Streaming of the token keys over a communications link allows for the added flexibility of streaming the token keys in a any sequential order, thus, allowing playback of the media file from its beginning to its end or, in the alternative, allowing playback of only those segments of the media file desired to be played back. All of the cryptographic token keys may also be transmitted to the client receiver as a single block of data for storage and later use. Transmitting all of the token keys in this manner could provide an additional level of flexibility for a user wherein the user could be assigned a specific predetermined time period, preset, and resetable, by the server, in which access and playback would be available. Use of such token keys, i.e., stored on the client receiver as a single block of data, may be commenced by entry of a password entered by the user or a real time signal sent to the client receiver from the server over the communications link.

At the client receiver, the preferred method further includes sequentially decrypting each one of the respective plurality of encrypted sequential data blocks using a corresponding one of the plurality of cryptographic token keys to recover each of the plurality of sequential data blocks and for playing back each recovered sequential data block.

In this manner, a server can transmit a multimedia file to a user, but use or playback of the multimedia file by the user remains under the control of the server.

DETAILED DESCRIPTION OF THE PREFERRED EMBODIMENT

Figure 1:
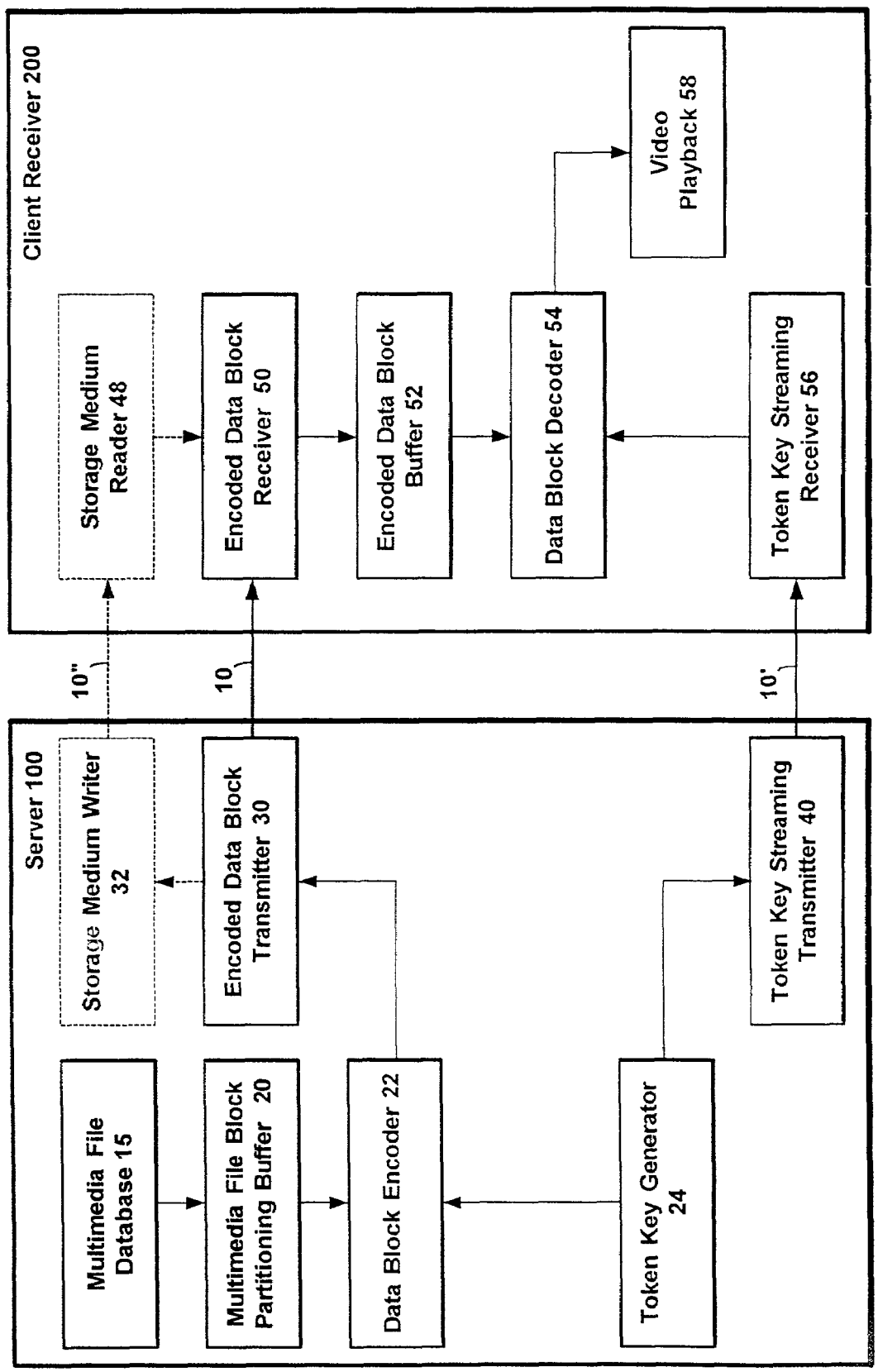
FIG. 1 is a network block diagram illustrating the server 100 and the client receiver 200.
Figure 2A:
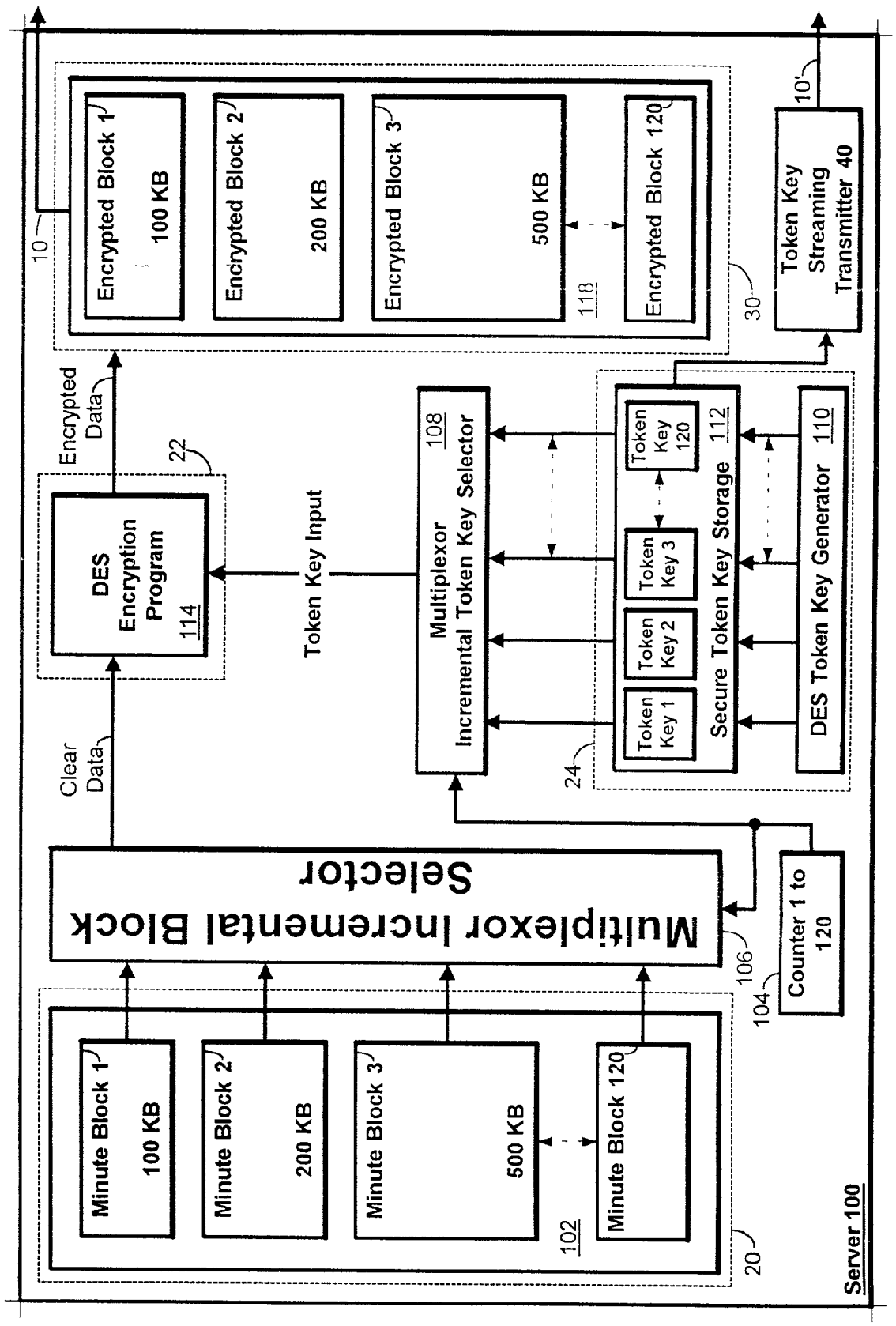
FIG. 2A is a more detailed functional block diagram of the server 100.

FIG. 1 shows a system block diagram of the preferred embodiment for enabling a media file, for example, a multimedia MPEG video file 102 as shown in FIG. 2A, to be transmitted from the server 100 to the client receiver 200 at a first time. At a second time, a series of cryptographic token keys are transmitted from the server 100 to the client receiver 200 to enable the user, at the client receiver 200, to view the contents of the multimedia file 102. The multimedia file 102 can be transmitted from the server 100 to the client receiver 200 either as a single, contiguous file in a file transfer protocol (FTP) transfer or, alternately, portions of the whole multimedia file may be sequentially transmitted from the server 100 to the client receiver 200. In either case, the multimedia file is buffered at the client receiver 200 for later viewing by the user at the client receiver 200. The preferred embodiment is, by way of example only, illustrated and described with reference to a multimedia file 102. It should be understood, however, that any type of media file may be used.

Figure 2B:
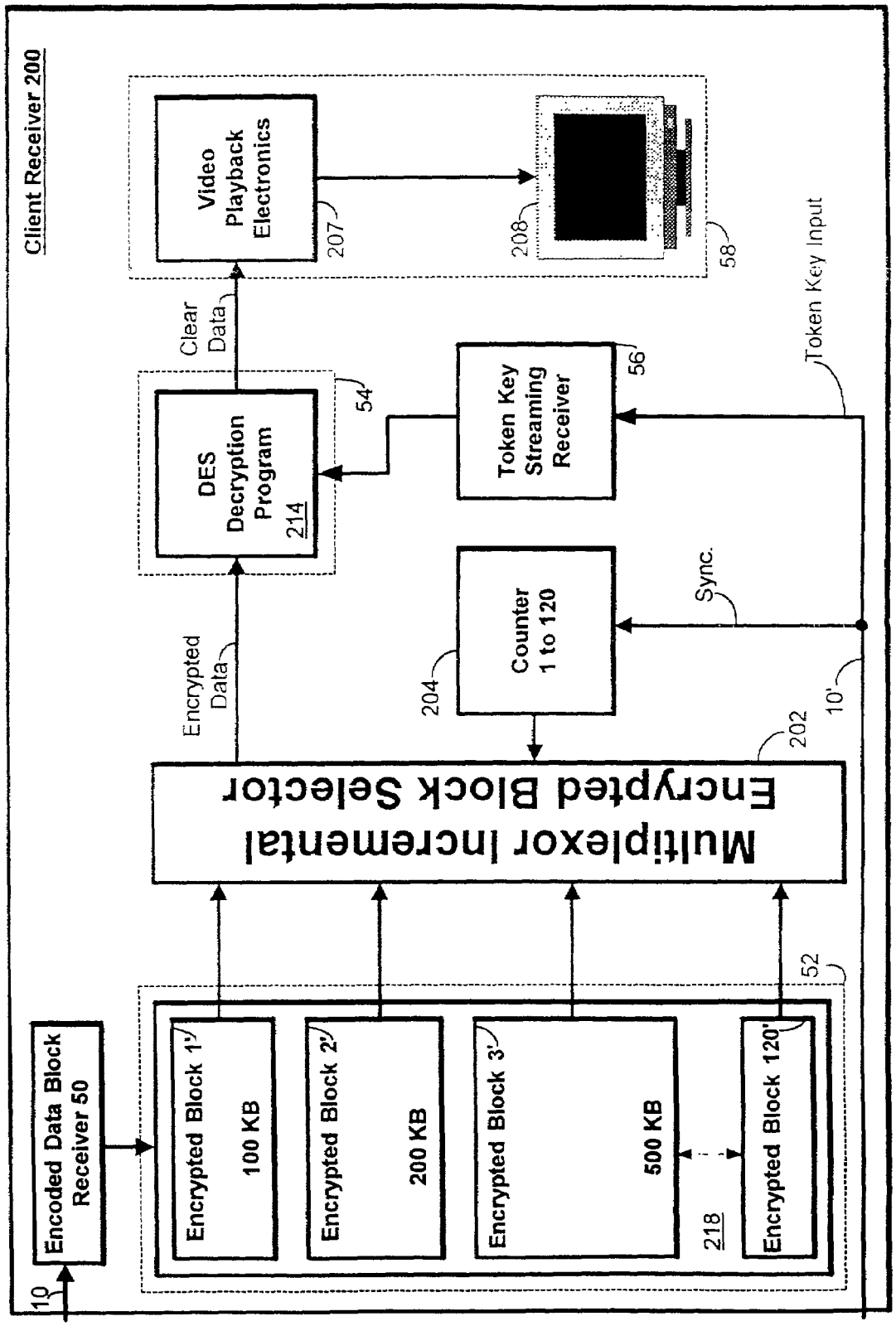
FIG. 2B is a more detailed functional block diagram of the client receiver 200.

Returning now to FIG. 1, the server 100 includes a multimedia file database 15 which can store the contents of the multimedia file 102. In accordance with the preferred embodiment, the multimedia file 102 is transferred to the multimedia file block partitioning buffer 20, where its contents are divided into a plurality of sequential data blocks. This can be seen to better advantage with reference to FIG. 2A, where, for illustration purposes, the multimedia file 102 is shown as being partitioned or divided into 120 one-minute sequential data blocks or minute blocks 1, 2, 3, etc. While the sequential data blocks are illustrated as minute blocks 1, 2, 3, etc., each block may, of course, be divided into any time duration or file size needed or desired. Returning to FIG. 1, each of the plurality of minute blocks 1, 2, 3, etc. of the multimedia file 102, shown in FIG. 2A, are sequentially transmitted to the data block encoder 22. As each of the minute blocks 1, 2, 3, etc., are received by the data block encoder 22, a corresponding cryptographic token key is generated by the token key generator 24 and likewise transmitted to the data block encoder 22. Upon receipt of each minute block 1, 2, 3, etc., and its corresponding token key 1, 2, 3, etc., the data block encoder 22, via a data encryption standard (DES) encryption software program, encrypts each minute block with a respective token key resulting in sequential encrypted blocks 1, 2, 3, etc., also shown in FIG. 2A, and forwarded to encoded block transmitter 30. Thereafter, each respective encrypted block 1, 2, 3, etc., is then transmitted by the encoded block transmitter 30 over the communications line 10 to the encoded data block receiver 50 of the client receiver 200 and buffered as an encrypted multimedia file 218 which is comprised of the collection of encrypted blocks 1', 2', 3', etc., in the encoded data block 52 of the client receiver 200 as shown in FIG. 2B. Transmission of the encrypted blocks 1, 2, 3, etc., from the server 100 to the client receiver 200, may be carried out sequentially or all at the same time by means of a file transfer protocol (FTP) procedure over communications line 10. This can result in the entire 120 encrypted data blocks 1', 2', 3', etc., being stored in the encoded data block buffer 52 all at the same time, or alternately, some portion of the 120 encrypted data blocks 1', 2', 3', etc., may be stored in the encoded data block buffer 52.

The client receiver 200 is better illustrated in FIG. 2B.

In an alternate embodiment, each of the respective encrypted blocks 1, 2, 3, etc., shown in FIG. 2A, may be alternatively written onto any machine readable storage medium, such as, for example, a CD-ROM, by means of a storage medium writer 32 in the server 100, shown in FIG. 1. Subsequently, the storage medium with the encrypted blocks 1, 2, 3, etc., may be passed on to a storage medium reader 48 at the client receiver 200 by any acceptable means 10", for example, by mail, for sale in a "brick and mortar" store, etc.

At a later time, which may be preselected by the user at the client receiver 200 or predetermined by the server 100, the token key streaming transmitter 40 of the server 100 transfers the 120 token keys, generated by the generator 24 and used to create the encrypted blocks 1, 2, 3, etc., over the path 10' to the token key streaming receiver 56 of the client receiver 200. The token keys transferred over the path 10' to the client receiver 200 are streamed in a sequence which is governed by the server 100. The sequence of the token keys received at the client receiver 200 are specified by the sequence of the encrypted blocks 1', 2', 3', etc., which can sequentially be decrypted by the data block decoder 54 of the client receiver. After each of the encrypted blocks 1', 2', 3', etc., have been successfully decrypted by the data block decoder 54 using each of the respective token keys 1, 2, 3, etc., the multimedia file 102 may be viewed by the user at the client receiver 200 using the video playback 58. In this manner, the server 100 can control the time and sequence of viewing of the contents in the multimedia file 102. The time and sequence of the viewing of the content of the multimedia file 102 may be determined in any manner conducive to the needs of the server 100 and the user at the client receiver 200.

Turning now to FIG. 2A, the multimedia file block partitioning buffer 20 is shown having its output connected to the multiplexor incremental block selector 106 which enables sequential incremental selection of each of the minute blocks 1, 2, 3, etc., of the multimedia file 102 from the multimedia file block partitioning buffer 20. This is done by means of the counter 104, counting from a value of one to a value of 120 in a monotonically increasing sequence, enabling the multiplexor 106 to sequentially connect each respective one of the minute blocks 1, 2, 3, etc., on the "clear data" line to the data block encoder 22. Also shown in FIG. 2A is the token key generator 24, which includes a data encryption standard (DES) token key generator 110. The token key generator 110 generates, in the illustrated example, a total of 120 unique token keys, one for each minute block to be encrypted. The output of the token key generator 24 is applied to the multiplexor incremental token key selector 108. The counter 104 is connected to both the multiplexor incremental block selector 106 and the multiplexor incremental token key selector 108. In this manner, a synchronous selection of each minute block 1, 2, 3, etc. and its corresponding token key 1, 2, 3, etc. may be accomplished. Each respective token key is therefore transmitted from the secure token key storage 112 to the data block encoder 22, over the token key input, during the same interval that each corresponding minute block 1, 2, 3, etc., is transmitted by the multiplexor incremental block selector 106 to the data block encoder 22.

The data block encoder 22 shown in FIG. 2A is a data encryption standard (DES) encryption program executed by a suitable data processor in the server 100. The DES encryption program 114 in the data block encoder 22 takes each minute block 1, 2, 3, etc. outputted by the multiplexor incremental block selector 106 over the "Clear Data" line and encodes it with a corresponding token key 1, 2, 3, etc., passed by the multiplexor incremental token key selector 108 from the secure storage 112. Therefore, each respective block 1, 2, 3, etc., is encrypted by the data block encoder 22 to form a corresponding encrypted data block 1', 2', 3', etc. Each encrypted block 1', 2', 3', etc. is subsequently transmitted over the "Encrypted Data" line and stored in an encrypted block buffer 118 of the encoded data block transmitter 30. As was previously discussed, all 120 encrypted blocks 1', 2', 3', etc. can fill the encrypted block buffer 118 before any blocks are transmitted over the communications line 10 to the client receiver 200. Alternately, one or more, but fewer that all of the encrypted blocks 1', 2', 3',etc. can be selectively transmitted over the communications line 10 to the client receiver 200.

As is shown in FIG. 2A a connection is provided from a secure token key storage 112 to the token key streaming transmitter 40, to enable the buffering of all 120 token keys in the secure token key storage, and the sequential transmission by the token key streaming transmitter 40 of individual, sequential tokens passed from the secure storage 112 to the path 10'. The predetermined time may be any time automatically set by the server 100 or any time agreed upon between the server 100 and the user at the client receiver 200.

FIG. 2B illustrates the path 10 which passes the encoded data blocks to the encoded block receiver 50, which are then transferred to the encoded data block buffer 52. It is seen that the encoded data buffer block 52 stores the encrypted blocks 1', 2', 3', etc. as an encrypted multimedia file 218. As each token key is streamed over the communications line 10' from the server 100 to the client receiver 200, a corresponding synchronization bit pattern is also transmitted over the communications line 10' which passes to the counter 204 in the client receiver 200. The synchronization bit pattern prompts the counter 204 to sequentially count from a value of 1 to 120 in a monotonically increasing order, wherein the value of each count is sequentially applied to the multiplexor incremental encrypted block selector 202 in FIG. 2B. In order to synchronize receipt of both the encrypted blocks 1', 2', 3'. etc. and their corresponding token keys for decryption in the data block decoder 54, the synchronization bit pattern is attached, as a header, for example, to token key before transmitting each corresponding token key over the communications line 10'. The counter 204 receives and interprets each synchronization bit pattern at the same time the token key streaming receiver 56 receives and interprets each corresponding token key.

As each respective synchronization bit pattern and token key are received on the path 10', a sequentially increasing count value is counted by the counter 204 and transmitted to the multiplexor incremental encrypted block selector 202 at the same time the token key is received by the token key streaming receiver 56. As each sequentially increasing count value output from the counter 204 is applied to the multiplexor incremental encrypted block selector 202, the multiplexor incremental encrypted block selector 202 is enabled to pass a corresponding one of the encrypted blocks 1', 2', 3', etc. to the data block decoder 54. This occurs at the same time interval that each respective token key is received by the client receiver 200 over the communications line 10' and passed by the token key streaming receiver 56 to the data block decoder 54. Upon receipt of the each pair of corresponding encrypted block 1', 2', 3', etc. and token key 1, 2, 3, etc. in the data block decoder 54, a data encryption standard (DES) decryption program 214 is executed in the data block decoder 54 to decode each encrypted block 1', 2', 3', etc. by means of a suitable data processor (not shown). This results in decrypted data being outputted over the "Clear Data" line and received by the video playback 58 where a resulting decrypted multimedia file (not shown) is processed by the video playback electronics 207 and displayed by the suitable video display 208.

The decrypted clear data is applied to the video playback 58 in the sequence the token keys are received over the communications line 10'. The video playback electronics 107 of the video playback 58 will decode the MPEG video information in each respective dycripted block (not shown) and output the video signal to the video display 208. In this manner, the server 100, can control the time and order of viewing of the portions of the video content at the client receiver 200.

Figure 3:
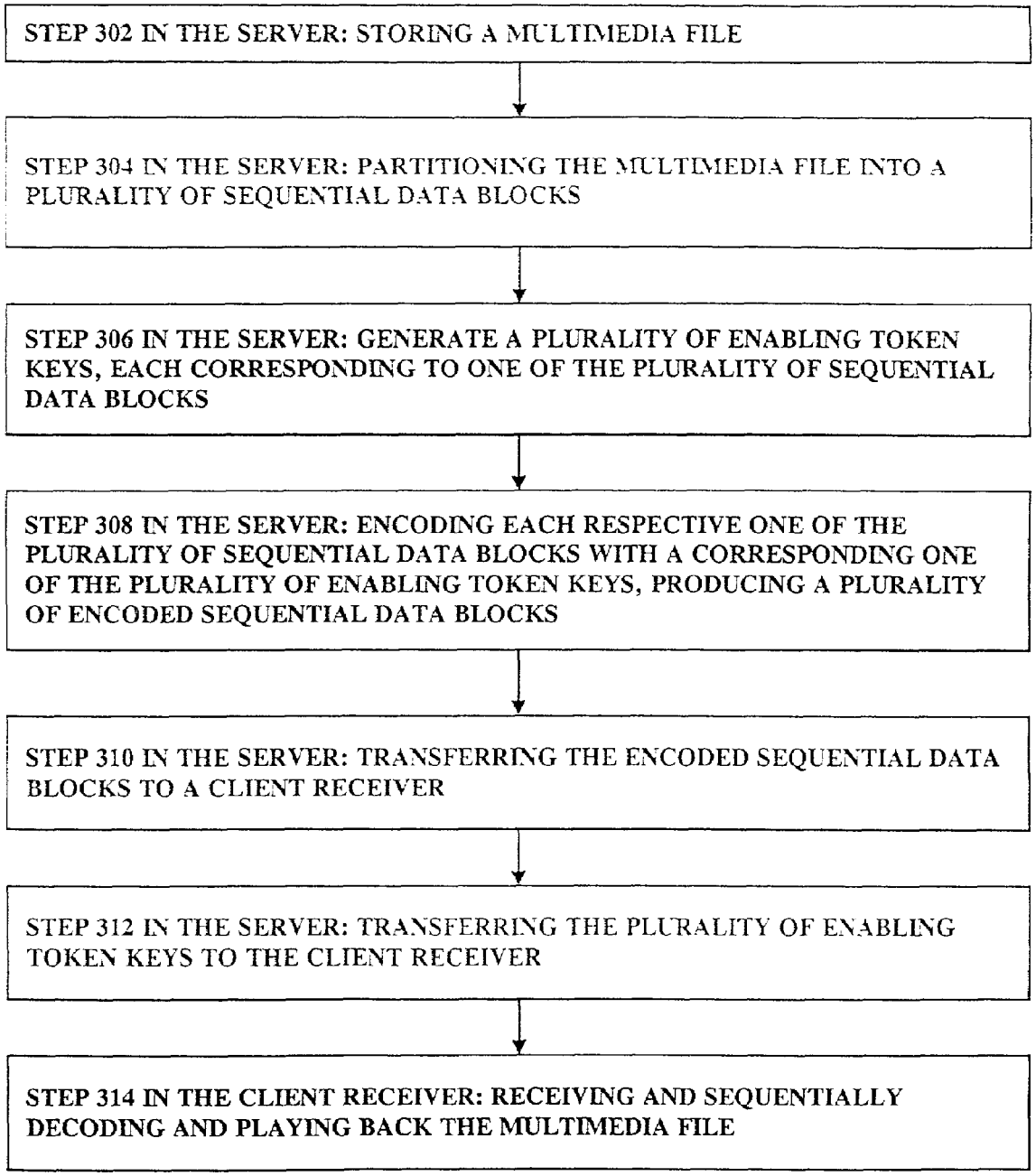
FIG. 3 is a flow diagram of the sequence of operational steps carried out by the server for enforcing the sequential playback of a media file.

Turning to FIG. 3, a flow diagram 300 of the method is disclosed which is carried out in the server 100 in accordance with the invention. In step 302, the server 100 stores the multimedia file 102 in the database 15 of FIG. 1. Then in step 304, the server 100 partitions the multimedia file 102 into a plurality of minute blocks 1, 2, 3, etc. in the multimedia block partitioning buffer 20 of FIG. 1. Then in step 306, the server 100 generates a plurality of token keys 1, 2, 3, etc., each corresponding to one of the plurality of minute blocks 1, 2, 3, etc. by means of the token key generator 24, in FIG. 1. Then, in step 308, the server 100 encrypts each respective one of a plurality of minute data blocks 1, 2, 3, etc. using a corresponding one of the plurality of enabling tokens 1, 2, 3, etc., thereby producing a plurality of encoded blocks 1', 2', 3', etc. which are then transmitted to the buffer 118 of the encoded data block transmitter 30, shown in FIG. 1. Then in step 310, the server 100 transfers the encrypted blocks 1', 2', 3', etc. to the client receiver. As was previously discussed, the transfer can either be by transmission over a network connection, such as the communications line 10 to the client receiver 200, or alternately it can be by means of writing the encrypted blocks 1', 2', 3', etc. to a machine readable storage medium (not shown) by a compatible storage medium write 32. The storage medium can be, for example, a CD-ROM, and the storage medium writer 32 a CD-ROM writer. The CD-ROM, with the encrypted blocks may be transferred to a user at the client receiver 200 as discussed above. In step 312, the server 100 will transfer, at a later time, a sequence of token keys to the client receiver over communications line 10'. It is by virtue of the control that the server 100 exercises over the timing and sequence each token key is transmitted over communications line 10', that the time and sequence of video playback of the multimedia file 102 is controlled at the client receiver 200. In step 314, the client receiver receives and sequentially decrypts the encrypted blocks and thereby sequentially plays back the contents of the multimedia file 102.

The invention is flexible in its many embodiments. For example, the granularity in which the multimedia file can be partitioned into blocks can be chosen in accordance with the convenience and design choices. For example, instead of choosing one minute duration blocks, either longer or shorter duration blocks can be chosen for partitioning in the partitioning buffer 20. As was noted previously, the depiction of the multimedia file 102 partitioned into 120 one-minute blocks 1, 2, 3, etc. is in no way intended to indicate or otherwise imply that preferred embodiment is limited thereby. Clearly, other time lengths and/or memory sizes may be employed. For example, FIG. 2A shows minute block 1 as having 100 kilobytes, minute block 2 as having 200 kilobytes, and minute block 3 as having 500 kilobytes. This is an example of how an MPEG video file is compressed using motion compensation techniques. As is well known in MPEG type motion compensation, the more motion that is detected in the scene for a video frame, the more information that must be included in the transmission from the encoder to the decoder. Thus, for example, minute block 1 is a smaller block which indicates that there is less motion in the scene than the larger minute block 2, for example. Reference can be made to a standard text on MPEG video compression, such as the following book by John Watkinson entitled "MPEG-2", published by Focal Press, 1999 (ISBN 0240515102).

The multimedia file 102 can be any machine readable file, for example video file, an audio file, a multimedia file (as illustrated), or a text file. As a further alternate embodiment, the multimedia file 102 can be generally considered as a time sequential presentation which can be perceived by one or more of the senses, such as by sight, by hearing, by feeling, by smelling or by tasting, depending upon the form of the content and the transducers detecting that content and recording same in the multimedia file 102. The compression of the multimedia file into plurality of sequential data blocks can be done using either MPEG video compression or MP3 audio compression, or other conventional types of multimedia information compression resulting in the compressed and partitioned minute blocks 1, 2, 3, etc. in the buffer 20, as shown in FIG. 2A. The token key generator 110 is disclosed as being an encryption token key generator, however, other forms of token keys can be provided, such as a simple random numbers or a sequence of other values that are chosen to be combined with each respective block 1, 2, 3, etc. in the data block encoder 22. The form of combination of the token key output by the generator 110 with the respective clear data minute block 1, 2, 3, etc., need not be an encryption as it is disclosed in FIG. 2A, but instead can be, for example, by a simple exclusive or operation concatenation, by any of a number of arithmetic or logical operations which combine the expression for the token key with the expression for the clear minute block 1, 2, 3, etc. Further, although it was disclosed that each respective token key transmitted by the transmitter 40 or the communication line 10' was sequentially transmitted, an alternate embodiment can transfer all of the tokens, such as tokens 1 through 120 to the client receiver 200 for buffering at the token key receiver 56. In order to control the time and sequence of viewing of the content of the multimedia file 102 at the client receiver 200, sequence numbers can be included in the token keys so that only after all of the token keys are received can any viewing take place. Such an embedded sequence value in each token key will govern or enforce the sequential playback of each respective multimedia minute block 1, 2, 3, etc. In other words, the server 100 would transmit all of the token keys in a token key block, wherein each respective token key can be retrieved from the token key block at the client receiver 200 in a sequence ordered by the order of occurrence of playback of each corresponding one of the partitioned multimedia file 102. This order of occurrence would be enforced by the embedding of the sequence number in each respective token. Thus, each token must be applied to the data block decoder 54 in the numerically increasing order of its embedded sequence number.

Although a specific embodiment has been disclosed, it will be understood, by those having skill in the art, that changes can be made to that specific embodiment without departing from the spirit and the scope of the invention.

What is claimed is:

1. A method for enforcing restricted access of a media file, comprising:
   storing a media file;
   partitioning the media file into a plurality of sequential data blocks;
   generating a plurality of cryptographic token keys;
   encrypting the plurality of sequential data blocks with the plurality of cryptographic token keys, thereby producing a plurality of encrypted sequential data blocks;
   transferring at least a subset of the plurality of encrypted sequential data blocks from a sending server to a receiving client;
   selecting, by the sending server, a subset of the plurality of cryptographic token keys for transfer to the receiving client, wherein the subset of the plurality of cryptographic token keys enables decryption of one of more corresponding encrypted sequential data blocks of the transferred subset of the plurality of encrypted sequential data blocks, thereby enabling the receiving client to access only a selected portion of the media file as defined by the sending server, in accordance with an access status of the receiving client, and wherein the subset of the plurality of cryptographic token keys comprises fewer cryptographic token keys than the plurality of cryptographic token keys; and
   transferring the subset of the plurality of cryptographic token keys from the sending server to the receiving client, wherein non-selected cryptographic token keys are not transferred to the receiving client as defined by the sending server, in accordance with the access status of the receiving client.

2. The method of claim 1, wherein the media file is a multimedia file.

3. The method of claim 1, wherein the media file is a video file.

4. The method of claim 1, wherein the media file is an audio file.

5. The method of claim 1, wherein the media file is a text file.

6. The method of claim 1, wherein the media file contains a time-sequential presentation which can be perceived by one or more of the senses.

7. The method of claim 1, wherein said partitioning further comprises:
   compressing selected ones of the plurality of sequential data blocks.

8. The method of claim 1, wherein said transferring further comprises:
recording the encrypted sequential data blocks on a recording medium.

9. The method of claim 1, wherein said transferring of at least a subset of the plurality of encrypted sequential data blocks further comprises:
transmitting over a communications link at least the subset of the plurality of encrypted sequential data blocks.

10. The method of claim 1, which further comprises:
sequentially decrypting at the receiving client, each of the one or more corresponding encrypted sequential data blocks of the transferred subset of the plurality of encrypted sequential data blocks using a corresponding one of the subset of plurality of cryptographic token keys, thereby recovering and providing access to the selected portion of the media file.

11. The method of claim 1, wherein said generating further comprises:
generating one cryptographic token key for each one of the plurality of sequential data blocks.

12. The method of claim 11, wherein said encrypting further comprises:
encrypting each one of the plurality of sequential data blocks with a corresponding one of the plurality of cryptographic token keys.

13. The method of claim 1, wherein said transferring of the subset of the plurality of cryptographic token keys further comprises:
transmitting over a communications link the subset of the plurality of cryptographic token keys.

14. The method of claim 13, which further comprises:
transmitting the subset of the plurality of cryptographic token keys in a sequence corresponding to a predetermined order of decryption of the one or more corresponding encrypted sequential data blocks of the transferred subset of the plurality of encrypted sequential data blocks.

15. The method of claim 13, which further comprises:
transmitting the subset of the cryptographic token keys in a token block, wherein each respective cryptographic token key may be retrieved from the token block in a sequence ordered by an order of occurrence decryption of the one or more corresponding encrypted sequential data blocks of the transferred subset of the plurality of encrypted sequential data blocks.

16. The method of claim 13, which further comprises:
streaming each of the subset of cryptographic token keys in a sequence ordered by an order of occurrence of decryption of the one or more corresponding encrypted sequential data blocks of the transferred subset of the plurality of encrypted sequential data blocks.

17. A system for enforcing restricted access of a media file, comprising:
a server for storing a media file;
a program in the server for partitioning the media file into a plurality of sequential data blocks;
a program in the server for generating a plurality of cryptographic token keys;
a program in the server for encrypting the plurality of sequential data blocks with the plurality of cryptographic token keys, thereby producing a plurality of encrypted sequential data blocks;
a program in the server for transferring at least a subset of the plurality of encrypted sequential data blocks from the server to a receiving client;
a program in the server for selecting a subset of the plurality of cryptographic token keys for transfer to the receiving client, wherein the subset of the plurality of cryptographic token keys enables decryption of one or more corresponding encrypted segmented data blocks of the transferred subset of the plurality of encrypted sequential data blocks; thereby enabling the receiving client to access only a selected portion of the media file as defined by the server, in accordance with an access status of the receiving client, and wherein the subset of the plurality of cryptographic token keys comprises fewer cryptographic token keys than the plurality of cryptographic token keys, and
a program in the server for transferring the subset of the plurality of cryptographic token keys from the server to the receiving client, wherein the non-selected cryptographic token keys are not transferred to the receiving client as defined by the sending server, in accordance with an access status of the receiving client.

18. A computer program product for enforcing restricted access of a media file, comprising:
a computer readable medium;
a computer program code for partitioning a media file into a plurality of sequential data blocks;
a computer program code in said computer readable medium for generating a plurality of cryptographic token keys;
a computer program code in said computer readable medium for encrypting the plurality of sequential data blocks with the plurality of cryptographic token keys, thereby producing a plurality of encrypted sequential data blocks;
a computer program code in said computer readable medium for transferring at least a subset of the plurality of encrypted sequential data blocks from a sending server to a receiving client;
a computer program code in said computer readable medium for selecting a subset of the plurality of cryptographic token keys for transfer to the receiving client, wherein the subset of the plurality of cryptographic token keys enables decryption of one or more corresponding encrypted sequential blocks of the transferred subset of the plurality of encrypted sequential data blocks, thereby enabling the receiving client to access only a selected portion of the media file as defined by the sending server, in accordance with an access status of the receiving client, and wherein the subset of the plurality of cryptographic token keys comprises fewer cryptographic token keys than the plurality of cryptographic token keys; and
a computer program code in said computer readable medium for transferring the subset of the plurality of cryptographic token keys from the sending server to the receiving client, wherein the non-selected cryptographic token keys are not transferred to the receiving client as defined by the sending server, in accordance with an access status of the receiving client.

* * * * *